United States Patent [19]
Schwenk

[11] Patent Number: 5,835,598
[45] Date of Patent: Nov. 10, 1998

[54] PUBLIC KEY METHOD OF ENCODING DATA

[75] Inventor: Joerg Schwenk, Dieburg, Germany

[73] Assignee: Deutsche Telekom AG, Bonn, Germany

[21] Appl. No.: 630,701

[22] Filed: Apr. 12, 1996

[30] Foreign Application Priority Data

Apr. 12, 1995 [DE] Germany .................. 195 13 898.8

[51] Int. Cl.$^6$ ................................... H04L 9/30
[52] U.S. Cl. ................................................ 380/30
[58] Field of Search ................................. 380/30

[56] References Cited

U.S. PATENT DOCUMENTS

| | | | |
|---|---|---|---|
| 4,459,435 | 7/1984 | Foldvary et al. | 179/84 |
| 4,625,076 | 11/1986 | Okamoto et al. | 380/30 |
| 4,633,036 | 12/1986 | Hellman et al. | 380/30 |
| 5,142,579 | 8/1992 | Anderson | 380/30 |
| 5,199,070 | 3/1993 | Matsuzaki et al. | 380/30 |
| 5,220,606 | 6/1993 | Greenberg | 380/43 |
| 5,263,085 | 11/1993 | Shamir | 380/30 |
| 5,272,755 | 12/1993 | Miyaji et al. | 380/30 |
| 5,297,206 | 3/1994 | Orton | 380/30 |
| 5,307,404 | 4/1994 | Yatsunami | 379/386 |
| 5,351,297 | 9/1994 | Miyaji et al. | 380/30 |

FOREIGN PATENT DOCUMENTS

| | | | |
|---|---|---|---|
| 0 157 258 | 10/1985 | European Pat. Off. | H04L 9/00 |
| 24 49 882 | 10/1974 | Germany | H04M 11/00 |
| 25 24 973 | 6/1975 | Germany | H04M 1/65 |
| 37 04 177 C2 | 8/1988 | Germany . | |

OTHER PUBLICATIONS

Rivest, R. et al., "A Method for Obtaining Digital Signatures and Public–Key Cryptosystems", Communications of the ACM, vol. 21, No. 2 (Feb. 1978), pp. 120–126.

Diffie, W. et al., "New Directions in Cryptography", IEEE Transactions on Information Theory, vol. IT–22, No. 6, Nov. 1976, pp. 644–654.

Ben–Or, "Probabilistic Algorithms in Finite Fields", CH–1695–6/81/0000/0394$00.75 1981 IEEE, pp. 394–398.

Brecht, B., "The Future Has Already Started or Public Key Cryptography", pp. 97–106.

Koyama, K., Security and Unique Decipherability of Two–Dimensional Public Key Cryptosystems Jul. (1990).

Sakai, R., New Key Generation Algorithm for RSA Cryptosystem, pp. 90–97. (Jan. 1994).

Ein Gerat mit vielen Pluspunkten, pp. 61–62. (Mar. 1994.

Rabin, M., Digitalized Signatures and Public–Key Functions as Intractable as Factorization, Massachusetts Institute of Technology Laboratory for Computer Science pp. 1–16. (Jan. 1979).

Rivest, R. et al., A method for Obtaining Digital Signatures and Public–Key Cryptosystems, pp. 121–126. (Feb. 1978).

Symposium on Foundations of Computer Science, IEEE Catalog No. 81CH1695–6, Library of Congress No. 80–646634, Computer Society No. 376, pp. 394–398. Oct. 1981.

*Primary Examiner*—Salvatore Cangialosi
*Attorney, Agent, or Firm*—Kenyon & Kenyon

[57] ABSTRACT

A computerized public key process for encoding data makes it possible to achieve an even greater data privacy than known public key processes. The process achieves this by the fact that the public key is a number n that is the product of two large primary numbers p and q, and the private key includes these two primary numbers, and the data set m is encoded by breaking it down into the blocks $m_1, \ldots, m_k$ that are interpreted as numbers smaller than n, and the encoded data set includes the coefficients $a_{k-1}, \ldots a_0$ of the polynomial $P(x)=x^k+a_{k-1}x^{k-1}+\ldots+a_1x+a_0$: $=(x-m_1)\cdot \ldots \cdot(x-m_k)$ mod n. Decoding is accomplished by first determining the zero positions of the polynomials $P(x)$ mod p in finite field $GF(p)$ and $P(x)$ mod q in finite field $GF(q)$ with the help of the private key and then combining them with the help of the Chinese remainder theorem to yield solutions of the equation $P(x)=0$ mod n, where the blocks $m_1, \ldots m_k$ of data set m are contained in the quantity of solutions of the equation $P(x)=0$ mod n thus calculated. This invention can be used in all fields where the known public key methods are also used.

14 Claims, 1 Drawing Sheet

PUBLIC KEY METHOD OF ENCODING DATA

FIELD OF THE INVENTION

The present invention relates to a computerized method for encoding data by a microprocessor, which data may then be transmitted and decoded by another microprocessor. The method of encoding data is based on the difficulty of factoring large natural numbers, where exactly two codes are associated with each user: a publicly known key for encoding the data and a private key known only to the respective user for decoding the data. A user A (who wants to encode data to make it accessible only to user B) encodes the data with the help of user B's public key, and user B retrieves the data with the help of the private key.

BACKGROUND OF THE INVENTION

Public key encoding methods were introduced by articles by Diffie and Hellmann (W. Diffie, M. E. Hellmann, "New directions in cryptography," IEEE Transactions on Information Theory, vol. IT-22, November 1976, pages 644–654) and by Rivest, Shamir and Adleman (R. Rivest, A. Shamir and L. Adleman, "A method for obtaining digital signatures and public-key cryptosystems," Communications of the ACM, vol. 27, no. 2, February 1978, pages 120–126, the so-called RSA method). These methods use two keys, one for encoding and another for decoding. Anyone can encode a message with the public key, but only someone who knows the private key can decode the message.

There are various applications of public key methods. Separating the functionality into a public key and a private key greatly facilitates key management. Public key methods can also be used for replacing keys for other encoding processes (such as DES). The above-mentioned examples of applications are described in detail by Beutelspacher (A. Beutelspacher, *Cryptology,* Vieweg-Verlag 1994).

SUMMARY OF THE INVENTION

While these known methods have provided the best possibility of achieving reliable data privacy so far, an even greater level of security is desired. The object of this invention is thus to achieve such data privacy.

This object is achieved by a computerized public key method in which the public key is a number n that is the product of two large primary numbers p and q, and the private key includes these two primary numbers. The data set m is encoded by breaking it down into blocks $m_1 \ldots m_k$ that are interpreted as being numbers smaller than n, and the encoded data set includes the coefficients $a_{k-1}, \ldots, a_0$ of the polynomial $P(x) = x^k + a_{k-1}x^{k-1} + \ldots + a_1x + a_0 := (x-m_1) \cdot \ldots \cdot (x-m_k)$ mod n. Decoding is accomplished by first determining the zero positions of the polynomials $P(x)$ mod p in the finite field $GF(p)$ and $P(x)$ mod q in the finite field $GF(q)$ and then combining them with the help of the Chinese remainder theorem to yield solutions of the equation $P(x)=0$ mod n, where the blocks $m_1, \ldots m_k$ of data set m are contained among the solutions of the equation $P(x)=0$ mod n calculated in this way.

Advantageous embodiments of this process in the sense of achieving even greater data privacy are: (1) that, to facilitate finding data blocks $m_1, \ldots, m_k$ among the solutions of equation $P(x)=0$, before these data blocks are interpreted as numbers smaller than n, they are provided with additional information that establishes their sequence and makes it possible to differentiate them from the other solutions; and (2) that the numbers used satisfy the conditions $k \geq 2$ and $\log_2 n \approx 500$.

The process according to this invention, like the process described by Rivest, Shamir and Adleman, is based on the difficult mathematical problem of factoring numbers that are the product of two large primary numbers. The public key here is one such number and the private key includes the two primary numbers of this number.

The data privacy of the method described here can be defined mathematically with a greater precision than that of the most widely used RSA public key method. It also offers advantages in terms of speed in the encoding operation in comparison with the general RSA method.

DETAILED DESCRIPTION

Figure 1:
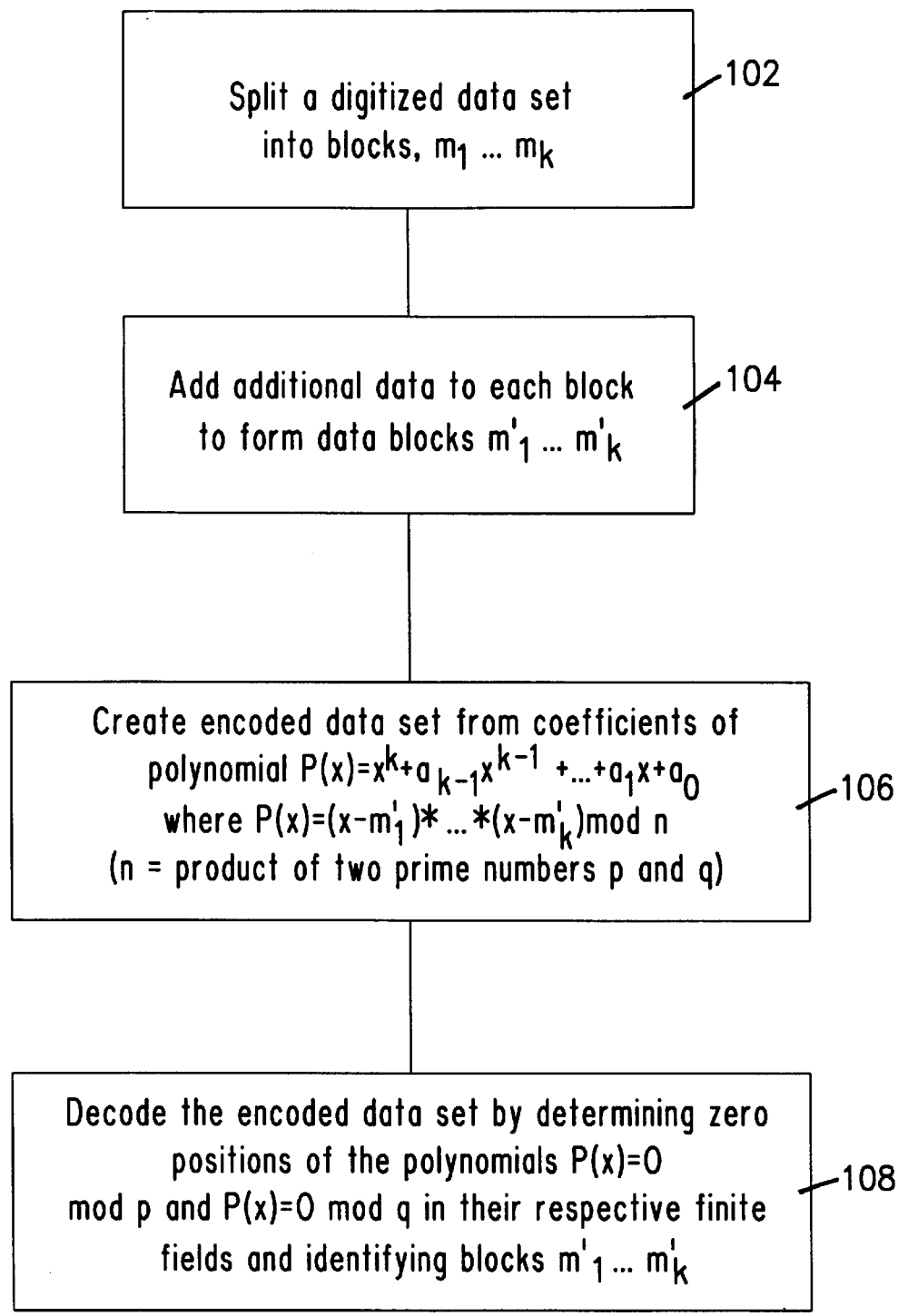
FIG. 1 shows a flowchart of the method of the present invention.

This process and possible refinements of it are explained in greater detail below with reference to practical examples.

Use of an integer n that is the product of two large primary numbers p and q and polynomials over the ring $Z_n$ is essential to this invention. As shown in FIG. 1 at step 102, to encode a message m, it is broken down into blocks $m_1, \ldots m_k$, so these blocks can be interpreted as numbers smaller than n.

To encode the message, the polynomial $P(x) = x^k + a_{k-1}x^{k-1} + \ldots + a_1x + a_0 := (x-m_1) \cdot \ldots \cdot (x-m_k)$ mod n is formed, as shown at step 106. The numerical sequence $a_{k-1}, \ldots, a_1, a_0$ thus represents the encoded message m.

As shown at step 108, to decode the message, the zero positions of the polynomial $P(x)$ mod p in the finite field $Z_p$ and of $P(x)$ mod q in the finite field $Z_q$ are calculated—for example, with the help of the probabilistic algorithm described by Ben-Or (Ben-Or, "Probabilistic algorithms in finite fields," Proc. IEEE FOCS 1981, pages 394–398). One obtains with a high probability k solutions that can be combined with the help of the Chinese remainder theorem to yield $k^2$ solutions of the equation $P(x)=0$ mod n.

In order to be able to find the original blocks of plain text in the correct sequence, before the blocks mi are interpreted as a number smaller than n, they are preferably provided with redundant additional information that makes this possible, as shown at step 104.

It can be shown that the data privacy in the process according to this invention is equivalent to the difficulty of factoring the number n. If someone trying to break the code could find a solution to the equation $P(x)=0$ mod n, he could also factor the number n with a probabilistic method. For this method to be secure, the numbers that occur should at least meet the following conditions:

$k \geq 2$ and $\log_2 n \approx 500$.

To provide a simple example, the parameters have been selected so they are very small. If p=1237 and q=5683, then n=7029871. To encode the message m=123456789101112, it is divided into three blocks $m_1=12345$, $m_2=67891$ and $m_3=01112$. Then the blocks are provided with additional information, which in this example includes simply of placing the digits ii at the beginning of $m_1$:

$m_1' = 1112345$, $m_2' = 2267891$ and $m_3' = 3301112$.

Then the following is formed:

$$P(x) = x^3 + 348523x^2 + 3270693x + 5041428$$

and the encoded message is:

(348523, 3270693, 5041428).

For decoding, two polynomials are formed:

$$P(x) \bmod p = x^3 + 926x^2 + 65x + 653 \approx (x-796)(x-470)(x-282) \bmod p \text{ and}$$

$$P(x) \bmod q = x^3 + 1860x^2 + 2968x + 607 \approx (x-4972)(x-4160)(x-374) \bmod q.$$

The expanded Euclidian algorithm yields the notation: $-2683 \cdot p + 584 \cdot q = 1$. (The variables p and q are known to the decoder microprocessor.)

The following table can be constructed with the help of this formulation by calculating the following numbers for each zero position $z_p$ of $P(x) \bmod p$ and $z_q$ of $P(x) \bmod q$: $-2683 \cdot p \cdot z_q + 584 \cdot q \cdot z_p \bmod n$.

| mddq\modp | 796 | 470 | 282 |
|---|---|---|---|
| 4972 | 3301112 | 3948974 | 5659557 |
| 4160 | 57833771 | 6431633 | 1112345 |
| 374 | 1620029 | 2267891 | 3978474 |

The data blocks $m_1' = 1112345$, $m_2' = 2267891$ and $m_3' = 3301112$ can easily be differentiated from the other zero positions on the basis of their special structure and thus the message m can be recovered after removing the additional information.

The above described method is performed by an encoding microprocessor and a decoding microprocessor. In addition, the Chinese remainder theorem calculations could be performed not only by the decoder microprocessor itself, but also by a special apparatus associated with the decoder microprocessor, for example that described in U.S. Pat. No. 4,709,345, which is hereby expressly incorporated by reference herein.

Commonly-assigned U.S. Patent application Ser. No. 08/631,278, filed on Apr. 12, 1996, now pending is hereby expressly incorporated by reference herein.

What is claimed is:

1. A computerized method of data encryption where an encoding computer uses a public key for encoding the data and a decoding computer uses a private key for decoding the data, the public key being a number n that is the product of two primary numbers p and q and the private key being the primary numbers p and q, the method comprising the steps of:

splitting a digitized data set m to be encoded into k blocks, $m_1 \ldots m_k$;

creating an encoded data set including the coefficients $a_{k-1}, \ldots, a_0$ of a polynomial $P(x) = x^k + a_{k-1} x^{k-1} + \ldots + a_1 x + a_0$, where the polynomial $P(x) = (x-m_1) \cdot \ldots \cdot (x-m_k) \bmod n$; and decoding the encoded data set by determining zero positions of polynomials $P(x) \bmod p$ in finite field $GF(p)$ and $P(x) \bmod q$ in finite field $GF(q)$ and using the zero positions to find solutions of the equation $P(x) = 0 \bmod n$, the blocks $m_1, \ldots m_k$ of data set m being contained among the solutions of the equation $P(x) = 0 \bmod n$.

2. The computerized method as recited in claim 1 wherein $k \geq 2$.

3. The computerized method as recited in claim 1 wherein $\log_2 n \approx 500$.

4. The computerized method as recited in claim 1 wherein the Chinese remainder method is used to find solutions to the equation $P(x) = 0 \bmod n$.

5. The computerized method as recited in claim 1 wherein each block $m_1 \ldots m_k$ has a value less than n.

6. A computerized method of data encryption where an encoding computer uses a public key for encoding the data and a decoding computer uses a private key for decoding the data, the public key being a number n that is the product of large primary numbers p and q and the private key being the primary numbers p and q, the method comprising the steps of:

splitting a digitized data set m to be encoded into k blocks, $m_1 \ldots m_k$;

adding additional data to each block $m_1 \ldots m_k$ to form data blocks $m'_1 \ldots m'_k$;

creating an encoded data set including the coefficients $a_{k-1}, \ldots, a_0$ of a polynomial $P(x) = x^k + a_{k-1} x^{k-1} + \ldots + a_1 x + a_0$, where the polynomial $P(x) = (x-m'_1) \cdot \ldots \cdot (x-m'_k) \bmod n$;

decoding the encoded data set by determining zero positions of the polynomials $P(x) \bmod p$ in finfite field $GF(p)$ and $P(x) \bmod q$ in finite field $GF(q)$, using the zero positions to find solutions of the equation $P(x) = 0 \bmod n$, and identifying the blocks $m'_1, \ldots m'_k$, which are contained among the solutions of the equation $P(x) = 0 \bmod n$, on the basis of the additional data added to each block.

7. The computerized method as recited in claim 6 further comprising the step of removing the additional data from the retrieved data blocks $m'_1, \ldots m'_k$.

8. The computerized method as recited in claim 6 wherein $k \geq 2$.

9. The computerized method as recited in claim 6 wherein $\log_2 n \approx 500$.

10. The computerized method as recited in claim 6 wherein the Chinese remainder method is used to find solutions to the equation $P(x) = 0 \bmod n$.

11. The computerized method as recited in claim 6 wherein each block $m'_1 \ldots m'_k$ has a value less than n.

12. The computerized method as recited in claim 6 wherein the additional data makes the data blocks $m'_1 \ldots m'_k$ easily recognizable.

13. The computerized method as recited in claim 6 wherein the additional data provides information on the correct sequence of the data blocks $m'_1 \ldots m'_k$.

14. The computerized method as recited in claim 6 wherein the additional data comprises two identical integers ii.

* * * * *

UNITED STATES PATENT AND TRADEMARK OFFICE
CERTIFICATE OF CORRECTION

PATENT NO. : 5,835,598
DATED : November 10, 1998
INVENTOR(S) : Joerg Schwenk

It is certified that error appears in the above-identified patent and that said Letters Patent is hereby corrected as shown below:

Column 2, lines 32-33 "$x^{k}1+$" should be -- $x^{k-1}+$ --;

Column 2, line 48, "mi" should be -- $m_i$ --;

Column 3, line 25, "mddq\modp" should be -- mod q\mod p --;

Column 4, line 32, "finfite" should be -- finite --.

Signed and Sealed this

Seventh Day of September, 1999

Q. TODD DICKINSON

*Attest:*

*Attesting Officer*  Acting Commissioner of Patents and Trademarks